(12) United States Patent
Reyes et al.

(10) Patent No.: US 12,247,166 B2
(45) Date of Patent: Mar. 11, 2025

(54) DRAG REDUCING AGENT FOR EMULSIFIED ACIDS

(71) Applicant: Halliburton Energy Services, Inc., Houston, TX (US)

(72) Inventors: Enrique Antonio Reyes, Houston, TX (US); Kristina Henkel Holan, Houston, TX (US); Antonio Recio, III, Houston, TX (US); Nicole Mast, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/242,651

(22) Filed: Sep. 6, 2023

(65) Prior Publication Data

US 2024/0384161 A1 Nov. 21, 2024

Related U.S. Application Data

(60) Provisional application No. 63/502,160, filed on May 15, 2023.

(51) Int. Cl.
*E21B 43/27* (2006.01)
*C09K 8/64* (2006.01)
*C09K 8/74* (2006.01)

(52) U.S. Cl.
CPC .......... *C09K 8/74* (2013.01); *C09K 8/64* (2013.01); *E21B 43/27* (2020.05); *C09K 2208/28* (2013.01)

(58) Field of Classification Search
CPC ........ C09K 8/74; C09K 8/64; C09K 2208/28; E21B 43/27
See application file for complete search history.

(56) References Cited

U.S. PATENT DOCUMENTS

| | | | |
|---|---|---|---|
| 6,017,854 A * | 1/2000 | Van Slyke | C09K 8/32 507/221 |
| 6,204,224 B1 * | 3/2001 | Quintero | C09K 8/32 507/224 |
| 8,030,252 B2 | 10/2011 | Shumway | |
| 2006/0144595 A1 | 7/2006 | Milligan et al. | |
| 2012/0043086 A1 * | 2/2012 | Al-Mutairi | E21B 43/27 166/310 |
| 2014/0116695 A1 * | 5/2014 | Maghrabi | C09K 8/36 166/279 |
| 2014/0158360 A1 * | 6/2014 | Halliday | C09K 8/34 166/305.1 |
| 2014/0259887 A1 | 9/2014 | Kornfield et al. | |
| 2014/0367100 A1 * | 12/2014 | Oliveira | C09K 8/80 166/280.1 |
| 2016/0145397 A1 | 5/2016 | Kornfield et al. | |
| 2016/0305613 A1 | 10/2016 | Milligan et al. | |
| 2017/0081466 A1 | 3/2017 | Kornfield et al. | |
| 2017/0335175 A1 * | 11/2017 | Oliveira | E21B 43/26 |
| 2019/0390104 A1 | 12/2019 | Sultan et al. | |
| 2020/0247977 A1 | 8/2020 | Kornfield et al. | |
| 2021/0079284 A1 * | 3/2021 | Deville | C09K 8/34 |

OTHER PUBLICATIONS

Wei, M.-H.; Li, B.; David, R. L. A.; Jones, S. C.; Sarohia, V.; Schmitigal, J. A.; Kornfield, J. A. (2015). Megasupramolecules for safer, cleaner fuel by end association of long telechelic polymers. Science, 350(6256), 72-75.
Ahmed, et al., (2018). A Novel Emulsified Acid for Deep Wells Stimulation: Rheology, Stability, and Coreflood Study, SPE-192312-MS.
Adewunmi, et al., Journal of Petroleum Science and Engineering, Emulsified acid systems for oil well stimulation: a review, 2021.
International Search Report and Written Opinion for International Patent Application No. PCT/US2023/032753 dated Feb. 14, 2024. PDF file. 8 pages.

* cited by examiner

*Primary Examiner* — Silvana C Runyan
(74) *Attorney, Agent, or Firm* — Thomas Rooney; C. Tumey Law Group PLLC

(57) ABSTRACT

A method for acidizing a subterranean formation may include: preparing a water-in-oil emulsion comprising a non-polar phase, a polar phase, an emulsifier an acid, and a drag reducing agent; pumping the water-in-oil emulsion into a wellbore penetrating a subterranean formation above a fracture gradient of the subterranean formation to create or extend at least one fracture in the subterranean formation.

11 Claims, 1 Drawing Sheet

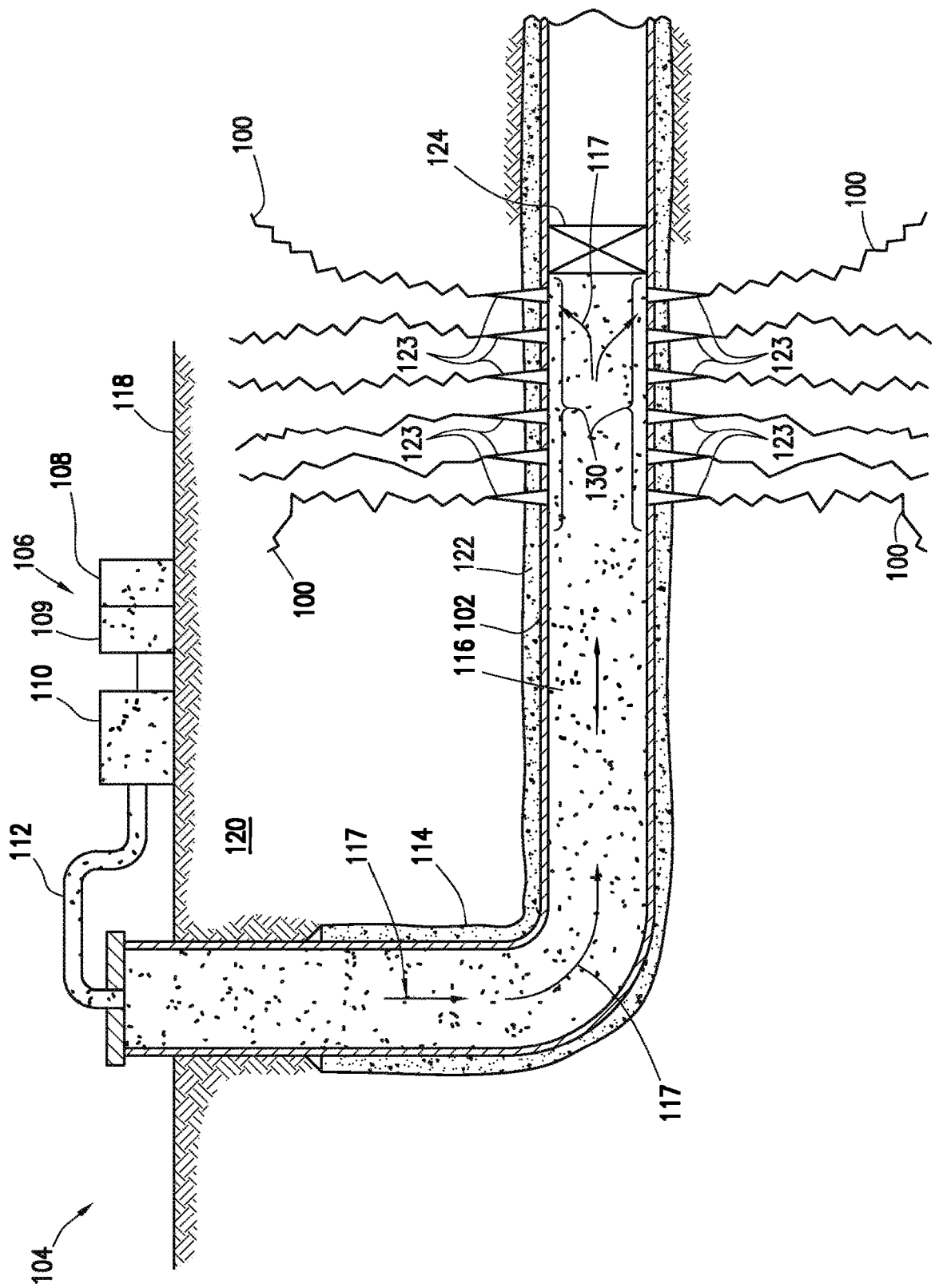

DRAG REDUCING AGENT FOR EMULSIFIED ACIDS

BACKGROUND

Natural resources such as gas and oil contained in a subterranean formation can be recovered by drilling wells into the formation. Well drilling involves drilling a wellbore down to the formation while circulating a drilling fluid through the wellbore. Various types of drilling fluids, also known as drilling muds, have been used in well drilling such as mineral oil-based fluids and synthetic oil-based fluids. Such drilling fluids typically form a thin, slick filter cake on the formation face that provides for successful drilling of the wellbore and that helps prevent loss of fluid to the subterranean formation.

Several stages may be used to produce oil found in subterranean formations. The first stage, which is known as the primary production stage, allows the oil to flow into a production well (or wells) under natural forces. First, the natural forces may be sufficient to drive the oil to the surface where it is recovered. However, at some point, pumps may be required to displace the oil from the wellbore to the surface. The primary production stage usually yields only about 5% to 15% of the oil in the reservoir. Thus, a secondary recovery operation is typically performed to recover additional amounts of the oil from the reservoir. A common secondary recovery operation known as secondary flooding involves injecting a fluid such as water into an injector well (or wells) to drive oil in the formation to the production well (or wells). Secondary flooding usually recovers up to an additional 50% of the original oil in the reservoir. Tertiary recovery operations such as tertiary flooding may also be used to drive the remaining oil from the formation to the production well.

Stimulation may also be used to enhance or restore the productivity of oil and gas from a well. Stimulation treatments fall into two main groups: hydraulic fracturing and matrix treatments. Fracturing treatments are performed above the fracture pressure of the subterranean formation to create or extend a highly permeable flow path between the formation and the wellbore. Matrix treatments are performed below the fracture pressure of the formation. Fracturing treatments are often applied in portions of the subterranean formation which has poor natural permeability to increase permeability while matrix treatments are often applied in portions of the subterranean formation having better natural permeability to counteract damage in the near-wellbore area and for cleanup operations.

Acidizing techniques can be carried out as matrix acidizing procedures or as acid fracturing procedures. Acidizing uses a treatment fluid including an aqueous acid solution introduced into the formation to dissolve acid-soluble materials. This way, hydrocarbon fluids can flow more easily from the formation into the well. For example, the acid forms conductive channels called wormholes in the formation rock in carbonate formation. In acid fracturing, an acidizing fluid is pumped into a subterranean formation at a sufficient pressure to cause fracturing of the formation and creating differential (non-uniform) etching fracture conductivity. Acid fracturing involves the formation of one or more fractures in the formation and the introduction of an aqueous acidizing fluid into the fractures to etch the fractures faces, whereby flow channels are formed when the fractures close. The aqueous acidizing fluid also enlarges the pore spaces in the fracture faces and in the formation. In acid fracturing treatments, one or more fractures are produced in the formation and the acidic solution is introduced into the fracture to etch flow channels in the fracture face. The acid also enlarges the pore spaces in the fracture face and in the formation. Furthermore, in other situations there is the need to inject an acidizing treatment fluid at high pumping rates due to the geophysical characteristics of the reservoir, namely natural fractures or extremely high or variable permeability contrasts (termed heterogenous) within the same reservoir. Under these conditions the volume of fluid injected can spend too fast, either due to the high reactivity of the acid, the reservoir rock or both as a function of temperature. It is then, under these circumstances, desirable to inject the acid treatment fluid at high pumping rates which can be limited in the case of an emulsified acid by the frictional losses incurred.

Although acidizing a portion of a subterranean formation can be beneficial to increase permeability, conventional acidizing systems have challenges in achieving desired permeability. For example, deeper penetration into the formation is not usually achievable because, inter alia, the acid may be spent before it can deeply penetrate into the subterranean formation. The rate at which acidizing fluids react with reactive materials in the subterranean formation is a function of various factors including, but not limited to, acid concentration, temperature, fluid velocity, mass transfer, and the type of reactive material encountered. Whatever the rate of reaction of the acidic solution, the solution can be introduced into the formation only a certain distance before it becomes spent. For instance, conventional acidizing fluids, such as those that contain organic acids, hydrochloric acid or a mixture of hydrofluoric and hydrochloric acids, have high acid strength and quickly react with the formation itself, fines, and damage nearest the wellbore, and do not penetrate the formation to a desirable degree before becoming spent. To achieve optimal results, it is desirable to maintain the acidic solution in a reactive condition for as long as possible to maximize the degree of penetration so that the permeability enhancement produced by the acidic solution may be increased.

Another problem associated with using acidic well fluids is the corrosion caused by the acidic solution to any metals (such as tubulars) in the wellbore and the other equipment used to carry out the treatment. For instance, conventional acidizing fluids, such as those that contain organic acids, hydrochloric acid, or a mixture of hydrofluoric and hydrochloric acids, have a tendency to corrode tubing, casing and downhole equipment, such as gravel pack screens and downhole pumps, especially at elevated temperatures. The expense of repairing or replacing corrosion-damaged equipment is extremely high. The corrosion problem is exacerbated by the elevated temperatures encountered in deeper formations. The increased corrosion rate of the ferrous and other metals comprising the tubular goods and other equipment results in quantities of the acidic solution being neutralized before it even enters the subterranean formation, which can compound the deeper penetration problem discussed above. The partial neutralization of the acid results in the production of quantities of metal ions that are highly undesirable in the subterranean formation.

One method to reduce corrosion and enhance acid penetration into the subterranean formation is to emulsify the acid to form a water-in-oil emulsified acid which has favorable viscosity and lower rate of reaction. However, emulsified acids have high frictional losses especially at high pumping rates associated with acid fracturing or when pumping the emulsified acid through relatively small internal diameter tubing. Friction reducers utilized in hydraulic fracturing are water soluble polymers which reduce eddy currents in a flowing fluid. However, there are no friction reducers which are stable at, and which can provide friction reduction from the surface to fluid wavefront through the subterranean formation under emulsified acid conditions at downhole temperatures such as from 200° F. (93° C.) to 400° F. (204° C.) under hydraulic fracturing conditions.

BRIEF DESCRIPTION OF THE DRAWINGS

These drawings illustrate certain aspects of some of the embodiments of the present disclosure and should not be used to limit or define the disclosure.

FIGURE a schematic view of an example well system utilized for hydraulic fracturing.

DETAILED DESCRIPTION

The present disclosure is directed to water-in-oil emulsified acids comprising an oil-soluble drag reducing agent and methods of using the water-in-oil emulsified acids in wellbore treatments. The water-in-oil emulsified acids may include an aqueous phase, an oleaginous phase, an acid, and a drag reducing agent. The drag reducing agent reduces the frictional losses experienced by the water-in-oil emulsified acid thereby enabling the water-in-oil emulsified acid to be used as a hydraulic fracturing fluid. The water-in-oil emulsified acid may also be used in matrix acidizing operations and cleanup operations.

The water-in-oil emulsified acids including the drag reducing agent are compatible with corrosion inhibitors required for relatively higher wellbore temperatures such as temperatures from 150° F. (65° C.) to 400° F. (204° C.). Further, the drag reducing agent of the present disclosure is able to maintain or recover viscosity while and/or after being exposed to high shear rates typically experienced by the treatment fluid in acid fracturing. In acidizing, the treatment fluid, experiences high shear during pumping from the surface to the wellbore, especially with small internal diameter tubing, and through the perforations on its way to the tip of the fractures. Under these high shear conditions water soluble friction reducer (FR) polymers utilized in hydraulic fracturing may distribute preferentially into the aqueous phase and not adequately partition into the oleaginous phase which is believed to be the cause of the high frictional forces experienced when injecting emulsified acids; additionally the combination of high strength acid and high temperature might be conducive to breaking of the water soluble FR into smaller segments and increasing friction pressure loss once the molecular weight of individual segments becomes too small.

The oleaginous phase of the water-in-oil emulsified acid may include any oleaginous fluid such as xylene, diesel, toluene, kerosene, aromatics such as benzene, refined hydrocarbons and mixtures thereof. Other suitable refined hydrocarbons and other aromatic hydrocarbons may include, but are not necessarily limited to, organic fluids such as aliphatic, alicyclic and aromatic hydrocarbons, esters, derivatives of these compounds, as well as mixtures thereof. Specific examples of suitable aliphatic hydrocarbons include, but are not necessarily limited to, alkanes such as n-octane, n-decane, n-tridecane, and higher carbon number alkanes. Other suitable aliphatic hydrocarbons include alkenes and alkadienes. Alicyclic compounds include cyclohexane, and the like. Specific examples of suitable aromatics include, but are not necessarily limited to, benzene, toluene, xylene, ethylbenzene and other alkyl benzenes, naphthalene, and the like. Other examples include nonyl-phenols, ethoxylated nonylphenol, and the like. Other specific examples of suitable organic fluids for the oleaginous phase include, but are not necessarily limited to, at least one of diesel, gasoline, kerosene, reformate, naphthalene, xylene, toluene, mineral oil, light mineral oil, condensate, crude oil, lubricating oils, base oils or mixtures thereof (such as diesel mixed with condensate to lower API gravity, etc.). Natural organic based fluids such as animal oils and vegetable oils may also be suitable including, but not necessarily limited to, linseed oil, palm oil, cotton seed oil, rapeseed oil, soybean oil, olive oil, canola oil, sunflower oil, peanut oil, date oil, and the like. Post-consumer oils such as waster oils, including recycled or repurposed oils as well as those hydrocarbon streams that arise from refinery processing operations.

The aqueous phase of the water-in-oil emulsified acid may include water and optionally one or more chemical species dissolved therein. The aqueous phase can be fresh water of differing ionic strength which is a function of various inorganic salts which may include, but are not limited to, alkali metal halides, oxyhalides, and hydroxides. Furthermore, the aqueous fluid may include a brine or seawater, aqueous solutions where the salt concentration is less than that of sea water, or aqueous solutions where the salt concentration is greater than that of seawater. Salts that may be associated to the use of seawater may include salts that produce disassociated ions of ammonium or quaternary alkyl or aryl ammonium, sodium, calcium, aluminum, magnesium, potassium, strontium, and lithium salts of halides, carbonates or percarbonates, borates or perborates, oxyhalides (oxo-salts of halides in the oxidation state of +1, +3, +5, and +7, such as hypochlorites, chlorites, chlorates or bromates), nitrates or nitrites, oxides, and phosphates or phosphonium which includes alkyl- or aryl-phosphonium or phosphinium salts, persulfates, selenates, arsenates, among others. Additionally the alkylammonium salts can include quaternary ammonium salts (NR+4), ternary ammonium salts (NHR3+), secondary ammonium salts (NH2R2+), primary ammonium salts (NH3R+), imidazolium salts, pyridinium salts, and pyrrolidinium salts, and akyl- or aryl-phosphonium salts may include quaternary phosphonium salts (PR4+), ternary phosphonium salts (PHR3+), secondary phosphonium salts (PH2R2+), primary phosphonium salts (PH3R+), sulfonium salts (SR3+), bis(triphenylphosphine) iminium (PPN) salts. In some embodiments, the brine may include one or more of the groups consisting of an alkali metal halide, an alkali metal carboxylate salt, an alkaline earth metal halide, and an alkaline earth metal carboxylate salt. In particular embodiments, the brine may comprise calcium chloride, zinc chloride, magnesium chloride, cesium chloride, bismuth chloride, titanium chloride.

The aqueous phase of the water-in-oil emulsified acid may include acids suitable for formation acidizing, including a strong acid such as hydrochloric acid, hydrobromic acid, hydroiodic acid, nitric acid, nitrous acid, or methane sulfonic acid and alkyl or aryl sulfonic acids, but can also be a weak acid such as an organic acid (formic acid, acetic acid, phosphoric acid, chloroacetic acid, or dichloroacetic acid for example) or inorganic acids of the oxyhalide type such as chloric acid, chlorous acid, where halide is any of fluoride, chloride, bromide, and iodide. The water-in-oil emulsified acid may have any suitable pH including, in a range from about 0.01 independently to about 3.0, alternatively from about 0.1 independently to about 1.5, about 1.5 to 2.0, about 2.0 to 3.0, or any ranges therebetween.

In embodiments the water-in-oil emulsified acid may include a metal ion complexing or chelating agent is advantageous when there is tendency to precipitate metal ions due to changes in ionic strength, saturation due to spending (which is the change in total acidity and a change in the overall ionic strength of said fluid due to the introduction of newly dissolved ions from the reservoir rock being contacted) or pressure changes (drops) as the acidizing treatment fluid is extracted from the reservoir. The water-in-oil emulsifier may be any chemical additive that creates an emulsion wherein water is the dispersed phase distributed into the oil continuous phase such as surfactants. Surfactants may include, without limitation, polysorbates, alkyl sulfosuccinates, alkyl phenols alkoxylates, ethoxylated alkyl phenols, alkyl benzene sulfonates, ethoxylated fatty acids, amides of fatty acids, alkanolamides, fatty acid amines, stearyl alcohol, lecithin, fatty acids, ethoxylated fatty acids, propoxylated fatty acids, fatty acid salts, resin oils, castor oils, triglycerides, ethoxylated triglycerides, alkyl glycosides.

The water-in-oil emulsified acid may further include a chelating agent to further stabilize the spent acid fluid composition, which is to signify that once the acid in the treatment fluid reacts with the carbonate reservoir rock there is an increase and a change in the chemical make-up of said fluid. Amongst the primary characteristics are a change and increase in pH due to the lowering of the acid concentration through acid consumption. Among the preferred chelating agents are those that are soluble in high concentrations of an acid, such as N,N'-bis(carboxymethyl) glycine (NTA), L-glutamic acid N,N-diacetic acid and its sodium salts such as mono-, di-, tri-and-tetra sodium salt (GLDA), HEDTA (N-hydroxyethyl-ethylenediamine-triacetic acid), hydroxyaminocarboxylic acid (HACA), hydroxyethyleneiminodiacetate (HEIDA), a sulfonated iminodialkanoic acid; or alternatively other chelating agents that have lower solubility characteristics in high acid concentrations or strength such as 1,2-cyclohexanediaminetetraacetic acid (CDTA), diethylenetriamineepentaacetic acid (DTPA), a tetrasodium salt of hydroxyiminodisuccinic acid (HIDS), methylglycine diacetic acid (MGDA), β-alanine diacetic acid, ethylenediaminedisuccinic acid (EDDS), iminodisuccinic acid (IDS), N-tris[(1,2-dicarboxyethoxy)ethyl]amine (TCA6), N-bis[2-(carboxymethoxy)ethyl]glycine (BCA3), N-bis[2-(1,2-dicarboxyethoxy)ethyl]glycine (BCA6), N-bis[2-(1,2-dicarboxyethoxy)ethyl]aspartic acid (BCA5), N-bis[2-(methylcarboxymethoxy)ethyl]glycine (MCBA3), N-bis[2-(1,2-dicarboxyethoxy)ethyl]methylglycineethanol-diglycinic acid (EDG), ethylenediaminetetraacetic acid (EDTA), hydroxymethyl-iminodiacetic acid, 2-(2-carboxy-ethylamino) succinic acid (CEAA), 2-(2-carboxymethyl-amino) succinic acid (CMAA), diethylenetriamine-N,N''-disuccinic acid, triethylenetetramine-N,N''-disuccinic acid, 1,6-hexamethylenediamine-N,N'-disuccinic acid, tetraethyl-enepentamine-N,N''-disuccinic acid, 2-hydroxypropylene-1,3-diamine-N,N'-disuccinic acid, 1,2-propylenediamine-N,N'-disuccinic acid, 1,3-propylenediamine-N,N'-disuccinic acid, cis-cyclohexanediamine-N,N'-disuccinic acid, trans-cyclohexanediamine-N,N'-disuccinic acid, ethylenebis(oxy-ethylenenitrilo)-N,N'-disuccinic acid, glucoheptanoic acid, cysteic acid-N,N-diacetic acid, cysteic acid-N-monoacetic acid, alanine-N-monoacetic acid, N-(3-hydroxysuccinyl) aspartic acid, N-[2-(3-hydroxysuccinyl)]-L-serine, aspartic acid-N,N-diacetic acid, aspartic acid-N-monoacetic acid, a polymer thereof, a salt thereof, a hydrate thereof, an acid thereof, an ester thereof, a derivative thereof, or any combination thereof; and sodium hexametaphosphate (SHMP).

The water-in-oil emulsified acid may further include an emulsion stabilizer such as silica, alumina, titania, zirconia, barite, nanoparticles or nanomaterials, covalently modified organic or metal-organic frameworks which can further include carbonaceous nanomaterials like graphene, graphene oxide, carbon nanotubes or nanosheets or nanodots, or boron nanomaterials such as boron nitride nanotubes or nanoparticles, surface modified argillaceous materials, zeolites, hybrid inorganic-organic materials.

Stability of water-in-oil emulsified acids are greatly impacted by the rheological properties of the non-miscible mixture composition. In the absence of stabilizing chemistry, the water droplets composing the dispersed or internal phase of the emulsion can vary in size and rigidity. This discrepancy in size and rigidity leads to non-ideal droplet aggregation, premature droplet coalescence, and phase separation. These factors render an emulsion difficult to pump through a pipe because of the excessive pressure drop or drag between the bulk fluid and tubular walls. However, the resulting water-in-oil emulsified acids tends to be relatively viscous that upon exposure to pipe flow, also generates excessive drag forces. This phenomenon may be eliminated or reduced significantly through the addition of drag reducing agent.

In some embodiments, the drag reducing agent of the water-in-oil emulsified acids of the present disclosure comprises Mega-Supra-Molecules (MSM), Emulsion Shear-thinning Enhancers (ESE), or any high or ultra-high molecular weight polymers capable of recovering from the high shear rates typically experienced in fracture acidizing and reform their associative bonds. MSM are very high molecular weight polymers capable of associating and reassembling even when high shearing forces are applied, as those encountered in pressure pumping. MSM may be in solid form or in dispersion form. In solid form, MSM may be dissolved in non-polar hydrocarbon, including but not limited to, xylene, diesel, toluene, kerosene, aromatics, refined hydrocarbons and mixtures, diesel, gasoline, kerosene, reformate, naphthalene, xylene, toluene, mineral oil, light mineral oil, condensate, crude oil, oils lubricants, and mixtures thereof (such as diesel mixed with condensate for minor API gravity, etc.).

MSM may be associative polymers having a non-polar backbone and functional groups presented at ends of the non-polar backbone. Functional groups may associate with each other and/or corresponding functional groups. Functional groups comprise carboxylic acids, amines, alcohols, diacetamidopyridine, thymine, cyanuric acid, for example. Examples of functional groups forming pairs of complementary functional groups include carboxylic acids, carboxylic acids with amines, alcohols with carboxylic acids, diacetamidopyridine with thymine. In some embodiments, the at least two ends of the associative polymers described herein identify at least two positions in the linear, branched or hyperbranched polymer backbone of the associative polymer that are separated by an internal span that has a length of at least 2,000 backbone bonds, or an internal span between functional groups with a weight average molar mass not less than 100,000 g/mol. Functional groups presented at an end of the polymer backbone may comprise groups attached to the terminal monomer of a polymer or to a monomer less than 100 monomers from a terminal monomer of the polymer. The self-associative polymer backbone may be linear or branched. The branched polymer may be di-functional, tri-functional, tetra-functional, or penta-functional polymers, for example. After association of the functional end groups, the self-associating polymer can form various supramolecular architectures, wherein the backbone length can be such that the backbone has a weight-averaged molecular weight of 250,000 g/mol and more for individual chains, for example.

In one or more embodiments, the backbone of the MSM may be a nonpolar linear, branched or hyper branched polymer or copolymer (e.g. substituted or unsubstituted polydienes such as poly(butadiene) (PB) and poly(isoprene), and substituted or unsubstituted polyolefins such as polyisobutylene (PIB) and ethylene-butene copolymers, poly (norbornene), poly(octene), polystyrene (PS), poly(siloxanes), polyacrylates with alkyl side chains, polyesters, and/or polyurethanes for example) providing a number of flexible repeat units between associative functional end groups. In some embodiments, the weight average molar mass (M) of the associative polymer can be equal to or lower than about 2,000,000 g/mol and in particular can be between about 100,000 g/mol and about 1,000,000 g/mol, between about 200,000 g/mol and about 900,000 g/mol, between about 300,000 g/mol and about 800,000 g/mol, between about 400,000 g/mol and about 700,000 g/mol, or between about 500,000 g/mol and about 600,000 g/mol and wherein the weight average molar mass may range from any lower limit to any upper limit and encompass any subset between the upper and lower limits.

In some embodiments, the drag reducing agent of the water-in-oil emulsified acids of the present disclosure comprises Emulsion Shear-thinning Enhancer (ESE). Suitable oil-soluble ESE comprise homopolymers, copolymers, or combinations of linear, branched or star-shaped structure, with molecular weights ranging from 2,500 g/mol to 500,000 g/mol. The ESE molecular weight may be from 10,000 g/mol to 500,000 g/mol. The ESE polymer may be polyalkylmethacrylate (PAMA), wherein the monomeric unit is either acrylate or methacrylate, and the ester moiety comprises alkyl, vinyl, allylic, or aryl substituents. The ESE polymer may be an olefin copolymer (OCP) derived from the combination between ethylene, propylene, and/or acetylene, distributed either randomly or in block copolymer. The ESE polymer may be a homopolymer of isobutylene. ESE may be hydrogenated styrene-butadiene (HSD) derived from the combinations of styrene, functionalized styrene, isoprene, and/or butadiene, and/or divinyl benzene, either in a random distribution or with block copolymeric distributions. Further, a latex composition or particle can impart drag reduction, where the corresponding molecular weight is 1,000,000 g/mol or higher. Under very low shear conditions, such as further out in the fractures where flow rate alone cannot suspend particles, these polymers should build more viscosity than standard drag reduction polymers because the average molecular weight of the associated polymers can exceed that of traditional polymers. This could have the added benefit of stabilizing the emulsion both in at rest conditions and under flow conditions. Further, these polymers may not require a breaker fluid contrary to traditional drag reducing agent. As the well starts to produce liquid, the concentration of the polymers of the ESE may fall below the critical concentration to effectively associate.

The drag reducing agent can also include polymers or copolymers of low density polyethylene, polyolefins, copolymer of 1-hexane cross linked with vinyl benzene, polyacrylamides, polyalkylmethacrylates and terpolymer of styrene, alkyl acrylate and acrylic acid.

In embodiments, the drag reducing agent may be present in the water-in-oil emulsified acids an amount from 1 ppm to 50,000 ppm. Alternatively, a lower limit of about 1 ppm, 5 ppm, 10 ppm, 20 ppm, 30 ppm, 40 ppm, 50 ppm, 75 ppm, 100 ppm, 200 ppm, 250 ppm, or 300 ppm to an upper limit of about 50,000 ppm, 400 ppm, 300 ppm, 250 ppm, 200 ppm, 100 ppm, or 75 ppm and wherein the amount may range from any lower limit to any upper limit and encompass any subset between the upper and lower limits.

The water-in-oil emulsified acids may further include a corrosion inhibitor, including, but not limited to intermediates selected from acetylenic alcohols; quaternary and polyquaternary ammonium compounds or heteronitrogen aromatics, α, β-unsaturated aldehydes, amines and Mannich reaction products; amides; tertiary amines selected from hexadecyl dimethyl amine, tetradecyl dimethyl amine, dodecyl dimethyl amine, imidazoline or alkyl pyridines, further alkylpyridine benzyl chloride quaternary salts, and combinations thereof.

The water-in-oil emulsified acids may further include a corrosion inhibiter intensifier, including, but not limited to, iodide salts selected from lithium iodide, sodium iodide, potassium iodide, calcium iodide, magnesium iodide, ammonium iodide, tetramethylammonium iodide, tetrapropylammonium iodide, tetrabutylammonium iodide, tetrapentylammonium iodide, tetrahexylammonium iodide, tetraheptylammonium iodide, tetraphenylammonium iodide, phenytrimethylammonium iodide and (ethyl)triphenylphosphonium iodide; salts of antimony or bismuth such as oxohalide and its higher isomers or congeners, halides, sulfides, selenides, phosphides, nitrites or nitrates.

The water-in-oil emulsified acids may further include an emulsifier. Emulsifiers may include, but are not necessarily limited to, low HLB surfactants or oil soluble surfactants. In one non-limiting embodiment the HLB is about 12 or below; alternatively, the HLB is about 10 or below; and in another non-limiting embodiment is about 8 or below. More specific suitable emulsifiers include, but are not necessarily limited to, polysorbates, alkyl sulfosuccinates, alkyl phenols, ethoxylated alkyl phenols, alkyl benzene sulfonates, fatty acids, ethoxylated fatty acids, propoxylated fatty acids, fatty acid salts, tall oils, castor oils, triglycerides, ethoxylated triglycerides, alkyl glucosides, and mixtures and derivatized fatty acids. Suitable polysorbates include, but are not necessarily limited to, sorbitan monolaurate, sorbitan monopalmitate, sorbitan monostearate, sorbitan monooleate, sorbitan monodecanoate, sorbitan monooctadecanoate, sorbitan trioleate and the like and ethoxylated derivatives thereof. For instance, these emulsifiers may have up to 20 ethoxy groups thereon. Other suitable emulsifiers include stearyl alcohol, lecithin, fatty acid amines, ethoxylated fatty acid amines and mixtures thereof.

In some embodiments, the water-in-oil emulsified acids are used in a wellbore and/or subterranean formation with a bottom hole static temperature (BHST) ranging from a lower limit of about 150° F. (65° C.), 175° F. (79.5° C.), 200° F. (93° C.), 225° F. (107° C.), 250° F. (121° C.), 275° F. (135° C.), 300° F. (149° C.), 325° F. (163° C.), or 350° F. (177° C.) to an upper limit of about 500° F. (260° C.), 450° F. (232° C.), 400° F. (204° C.), 350° F. (177° C.), 300° F. (149° C.), or 250° F. (121° C.) and wherein the temperature may range from any lower limit to any upper limit and encompass any subset between the upper and lower limits.

While a number of preferred embodiments described herein relate to acidizing treatment fluids, it is understood that other treatment fluids may also be prepared according to the present invention including, but not limited to, improving conductivity within the reservoir where the reservoir is one of (i) a naturally fractured, (ii) a vugular structure, where the permeability is greater than 100 milliDarcies up to 10

Darcies and the pumping treatment rate is not sufficient to hydraulically fracture said type of reservoir and wellbore clean outs.

FIGURE illustrates an example of a well system 104 that may be used to introduce proppant 116 into fractures 100. Well system 104 may include a fluid handling system 106, which may include fluid supply 108, mixing equipment 109, pumping equipment 110, and wellbore supply conduit 112. Pumping equipment 110 may be fluidly coupled with the fluid supply 108 and wellbore supply conduit 112 to communicate a fracturing fluid 117, which may comprise proppant 116 into wellbore 114. Proppant 116 may be any of the proppants described herein as well as modified halloysite nanotubes, unmodified halloysite nanotubes, and any combinations thereof. The fluid supply 108 and pumping equipment 110 may be above the surface 118 while the wellbore 114 is below the surface 118.

Well system 104 may also be used for the pumping of a pad or pre-pad fluid into the subterranean formation at a pumping rate and pressure at or above the fracture gradient to create at least one fracture 100 in subterranean formation 120. Well system 104 may then pump the fracturing fluid 117 into subterranean formation 120 surrounding the wellbore 114. Generally, a wellbore 114 may include horizontal, vertical, slanted, curved, and other types of wellbore geometries and orientations, and the proppant 116 may generally be applied to subterranean formation 120 surrounding any portion of wellbore 114, including fractures 100. The wellbore 114 may include the casing 102 that may be cemented (or otherwise secured) to the wall of the wellbore 114 by cement sheath 122. Perforations 123 may allow communication between the wellbore 114 and the subterranean formation 120. As illustrated, perforations 123 may penetrate casing 102 and cement sheath 122 allowing communication between interior of casing 102 and fractures 100. A plug 124 which may be any type of plug for oilfield applications (e.g., bridge plug), may be disposed in wellbore 114 below the perforations 123.

In accordance with systems and/or methods of the present disclosure, a perforated interval of interest 130 (depth interval of wellbore 114 including perforations 123) may be isolated with plug 124. A pad or pre-pad fluid may be pumped into the subterranean formation 120 at a pumping rate and pressure at or above the fracture gradient to create at least one fracture 100 in subterranean formation 120. Then, proppant 116 may be mixed with an aqueous based fluid via mixing equipment 109, thereby forming a fracturing fluid 117, and then may be pumped via pumping equipment 110 from fluid supply 108 down the interior of casing 102 and into subterranean formation 120 at or above a fracture gradient of the subterranean formation 120. Pumping the fracturing fluid 117 at or above the fracture gradient of the subterranean formation 120 may create (or enhance) at least one fracture (e.g., fractures 100) extending from the perforations 123 into the subterranean formation 120. Alternatively, the fracturing fluid 117 may be pumped down production tubing, coiled tubing, or a combination of coiled tubing and annulus between the coiled tubing and the casing 102.

At least a portion of the fracturing fluid 117 may enter the fractures 100 of subterranean formation 120 surrounding wellbore 114 by way of perforations 123. Perforations 123 may extend from the interior of casing 102, through cement sheath 122, and into subterranean formation 120. In embodiments, the fracturing fluid 117 comprises the water-in-oil emulsified acid.

To facilitate a better understanding of the present disclosure, the following examples of some embodiments are given. In no way should such examples be read to limit, or to define, the scope of the disclosure.

EXAMPLE

Several acidizing treatment fluids were prepared to test their thermal stability at 200° F. (93° C.) and 300° F. (149° C.). A control acidizing fluid was prepared containing 29 mL of diesel, 21.7 mL of water, 2.5 mL of an emulsifier, and 46.8 mL of 20% hydrochloric acid. A first acidizing was prepared containing 19 mL of diesel, 21.7 mL of water, 2.5 mL of emulsifier, 46.8 mL of hydrochloric acid, and 10 mL of diesel containing 30 ppm of MSM (0.5 g of MSM in 150 mL). A second acidizing fluid was prepared containing 30 wt. % diesel, 20 wt. % water, 2.5 wt. % low HLB surfactant, 45 wt. % hydrochloric acid, and 2.5 wt. % ESE. Each sample acidizing fluid was exposed to elevated temperature and afterwards it was observed that the acidizing fluids which contained the MSM or ESE had less phase separation than the control acidizing fluid. In each case, the acidizing fluid in accordance with an embodiment of the present disclosure shows less chemical degradation thanks to the presence of the drag reducing agent (MSM and/or ESE).

Accordingly, the present disclosure is related to a drag reducing agent compatible with water-in-oil emulsified acids for acid fracturing. The methods may include any of the various features disclosed herein, including one or more of the following statements.

Statement 1. A method comprising: preparing a water-in-oil emulsified acid comprising: an oleaginous phase; an aqueous phase; an acid; and an oil-soluble drag reducing agent; and pumping the water-in-oil emulsified acid into a wellbore penetrating a subterranean formation and flowing at least a portion of the water-in-oil emulsified acid into the subterranean formation.

Statement 2. The method of statement 1, wherein the drag reducing agent comprises at least one species selected from the group consisting of a mega-supra-molecule (MSM), an emulsion shear-thinning enhancer (ESE), and combinations thereof.

Statement 3. The method of any of statements 1-2, wherein the drag reducing agent comprises a mega-supra-molecules (MSM), wherein the mega-supra-molecules comprise a non-polar backbone and functional groups positioned at ends of the non-polar backbone wherein the functional groups form pairs of complementary functional groups at adjacent non-polar backbones.

Statement 4. The method of statement 3, wherein the functional groups are selected from the group consisting of carboxylic acids, amines, alcohols, diacetamidopyridine, thymine, cyanuric acid, and combinations thereof.

Statement 5. The method of any of statements 3-4, wherein an internal span between functional groups has a length of at least 2,000 backbone bonds and wherein the MSM has a weight average molar mass not less than 100,000 g/mol.

Statement 6. The method of any of statements 1-5, wherein the drag reducing agent comprises an emulsion shear-thinning enhancer (ESE) comprising homopolymers and/or copolymers, wherein the ESE comprises a linear, a branched, and/or a star-shaped polymer, and wherein the ESE comprises polymers with molecular weights in a range of from about 2,500 g/mol to about 500,000 g/mol.

Statement 7. The method of statement 6, wherein the ESE comprises at least one polymer selected from polyalkylmethacrylate, polyolefins, olefin copolymer, polyisobutylene, hydrogenated styrene-butadiene, and combinations thereof.

Statement 8. The method of statement 7, wherein the ESE comprises polyalkylmethacrylate polymer and wherein a monomeric unit of the polyalkylmethacrylate polymer is either acrylate or methacrylate, and an ester moiety of the polyalkylmethacrylate polymer comprises alkyl, vinyl, allylic, or aryl substituents.

Statement 9. The method of any of statements 7-8, wherein the ESE comprises the olefin copolymer and wherein the olefin copolymer is derived from the combination between ethylene, propylene, and/or acetylene, distributed either randomly or in block copolymer.

Statement 10. The method of any of statements 7-9, wherein the ESE comprises the hydrogenated styrene-butadiene wherein the hydrogenated styrene-butadiene is derived from the combinations of styrene, functionalized styrene, isoprene, and/or butadiene, and/or divinyl benzene, either in a random distribution or with block copolymeric distributions.

Statement 11. The method of any of statements 1-10, wherein the water-in-oil emulsified acid is pumped into the subterranean formation at a pressure above a fracture gradient of the subterranean formation to form at least one fracture in the subterranean formation.

Statement 12. A wellbore treatment fluid comprising: a water-in-oil emulsified acid comprising: an oleaginous phase; an aqueous phase; an acid; and an oil-soluble drag reducing agent.

Statement 13. The wellbore treatment fluid of statement 12, wherein the drag reducing agent comprises a mega-supra-molecules (MSM) comprising a non-polar backbone and functional groups positioned at ends of the non-polar backbone wherein the functional groups form pairs of complementary functional groups at adjacent non-polar backbones.

Statement 14. The wellbore treatment fluid of statement 13, wherein the functional groups are selected from the group consisting of carboxylic acids, amines, alcohols, diacetamidopyridine, thymine, cyanuric acid, and combinations thereof.

Statement 15. The wellbore treatment fluid of any of statements 12-14, wherein an internal span between functional groups has a length of at least 2,000 backbone bonds and wherein the MSM has a weight average molar mass not less than 100,000 g/mol.

Statement 16. The wellbore treatment fluid of any of statements 12-15, wherein the drag reducing agent comprises an emulsion shear-thinning enhancer (ESE) comprising homopolymers and/or copolymers, wherein the ESE comprises a linear, a branched, and/or a star-shaped polymer, and wherein the ESE comprises polymers with molecular weights in a range of from about 2,500 g/mol to about 500,000 g/mol.

Statement 17. The wellbore treatment fluid of any of statements 12-16, wherein the ESE comprises at least one polymer selected from polyalkylmethacrylate, olefin copolymer, polyisobutylene, hydrogenated styrene-butadiene, and combinations thereof.

Statement 18. The wellbore treatment fluid of any of statements 12-17, wherein the ESE comprises polyalkylmethacrylate polymer and wherein a monomeric unit of the polyalkylmethacrylate polymer is either acrylate or methacrylate, and an ester moiety of the polyalkylmethacrylate polymer comprises alkyl, vinyl, allylic, or aryl substituents.

Statement 19. The wellbore treatment fluid of any of statements 12-18, wherein the ESE comprises the olefin copolymer and wherein the olefin copolymer is derived from the combination between ethylene, propylene, and/or acetylene, distributed either randomly or in block copolymer.

Statement 20. The wellbore treatment fluid of any of statements 12-19, wherein the ESE comprises the hydrogenated styrene-butadiene wherein the hydrogenated styrene-butadiene is derived from the combinations of styrene, functionalized styrene, isoprene, and/or butadiene, and/or divinyl benzene, either in a random distribution or with block copolymeric distributions.

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the elements that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present disclosure is well adapted to attain the ends and advantages mentioned as well as those that are inherent therein. The particular examples disclosed above are illustrative only, as the present disclosure may be modified and practiced in different but equivalent manners apparent to those skilled in the art having the benefit of the teachings herein. Although individual examples are discussed, the disclosure covers all combinations of all those examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of the present disclosure. If there is any conflict in the usages of a word or term in this specification and one or more patent(s) or other documents that may be incorporated herein by reference, the definitions that are consistent with this specification should be adopted.

What is claimed is:
1. A method comprising:
   mixing a water-in-oil emulsified acid comprising:
      an oleaginous phase;
      an aqueous phase;

an acid, wherein the acid comprises at least one acid selected from the group consisting of hydrochloric acid, hydrobromic acid, hydroiodic acid, nitric acid, nitrous acid, methane sulfonic acid, alkyl or aryl sulfonic acids, formic acid, acetic acid, phosphoric acid, chloroacetic acid, dichloroacetic acid, oxyhalide wherein the oxyhalide is any oxide of fluoride, chloride, bromide, and iodide, and any combination thereof; and an oil-soluble drag reducing agent, wherein the oil-soluble drag reducing agent comprises at least one species selected from the group consisting of a mega-supra-molecule (MSM), an emulsion shear-thinning enhancer (ESE), and combinations thereof; wherein the water-in-oil emulsified acid has a pH from about 0.01 to about 3.0; wherein the water-in-oil emulsified acid has an original viscosity;

pumping the water-in-oil emulsified acid into a wellbore penetrating a subterranean formation through perforations;

allowing a recovery of the original viscosity of the water-in-oil emulsifier acid after pumping it through the perforations; and flowing at least a portion of the water-in-oil emulsified acid into the subterranean formation.

2. The method of claim 1, wherein the drag reducing agent comprises a mega-supra-molecules (MSM), wherein the mega-supra-molecules comprise a non-polar backbone and functional groups positioned at ends of the non-polar backbone wherein the functional groups form pairs of complementary functional groups at adjacent non-polar backbones.

3. The method of claim 2, wherein the functional groups are selected from the group consisting of carboxylic acids, amines, alcohols, diacetamidopyridine, thymine, cyanuric acid, and combinations thereof.

4. The method of claim 2, wherein an internal span between functional groups has a length of at least 2,000 backbone bonds and wherein the MSM has a weight average molar mass between 100,000 g/mol and 2,000,000 g/mol.

5. The method of claim 1, wherein the drag reducing agent comprises an emulsion shear-thinning enhancer (ESE) comprising homopolymers and/or copolymers, wherein the ESE comprises a linear, a branched, and/or a star-shaped polymer, and wherein the ESE comprises polymers with molecular weights in a range of from 2,500 g/mol to 500,000 g/mol.

6. The method of claim 5, wherein the ESE comprises at least one polymer selected from polyalkylmethacrylate, polyolefins, olefin copolymer, polyisobutylene, hydrogenated styrene-butadiene, and combinations thereof.

7. The method of claim 6, wherein the ESE comprises polyalkylmethacrylate polymer and wherein a monomeric unit of the polyalkylmethacrylate polymer is either acrylate or methacrylate, and an ester moiety of the polyalkylmethacrylate polymer comprises alkyl, vinyl, allylic, or aryl substituents.

8. The method of claim 6, wherein the ESE comprises the olefin copolymer and wherein the olefin copolymer is derived from the combination between ethylene, propylene, and acetylene, distributed either randomly or in block copolymer.

9. The method of claim 6, wherein the ESE comprises the hydrogenated styrene-butadiene wherein the hydrogenated styrene-butadiene is derived from the combinations of styrene, functionalized styrene, isoprene, butadiene, and divinyl benzene, either in a random distribution or with block copolymeric distributions.

10. The method of claim 1, wherein the water-in-oil emulsified acid is pumped into the subterranean formation at a pressure above a fracture gradient of the subterranean formation to form at least one fracture in the subterranean formation.

11. A method comprising:
mixing a water-in-oil emulsified acid comprising:
an oleaginous phase;
an aqueous phase;
an acid, wherein the acid comprises at least one acid selected from the group consisting of hydrochloric acid, hydrobromic acid, hydroiodic acid, nitric acid, nitrous acid, methane sulfonic acid, alkyl or aryl sulfonic acids, formic acid, acetic acid, phosphoric acid, chloroacetic acid, dichloroacetic acid, oxyhalide wherein the oxyhalide is any oxide of fluoride, chloride, bromide, and iodide, and any combination thereof; and
an oil-soluble drag reducing agent, wherein the oil-soluble drag reducing agent comprises
an emulsion shear-thinning enhancer (ESE) comprising homopolymers and/or copolymers, wherein the ESE comprises a linear, a branched, and/or a star-shaped polymer, and wherein the ESE comprises polymers with molecular weights in a range of from 2,500 g/mol to 500,000 g/mol,
wherein the ESE comprises the olefin copolymer and wherein the olefin copolymer is derived from a combination between ethylene and acetylene, distributed either randomly or in block copolymer; and
pumping the water-in-oil emulsified acid into a wellbore penetrating a subterranean formation and flowing at least a portion of the water-in-oil emulsified acid into the subterranean formation.

* * * * *